United States Patent [19]

Davies

[11] Patent Number: 5,691,033
[45] Date of Patent: Nov. 25, 1997

[54] COATING COMPOSITIONS CONTAINING ALUMINUM PIGMENT AND METHODS OF COATING

[75] Inventor: Martha A. Davies, Louisville, Ky.

[73] Assignee: Reynolds Metals Company, Richmond, Va.

[21] Appl. No.: 623,525

[22] Filed: Mar. 29, 1996

Related U.S. Application Data

[63] Continuation-in-part of Ser. No. 481,949, Jun. 7, 1995, abandoned.

[51] Int. Cl.$^6$ .................................. C08K 5/37; C08K 3/08
[52] U.S. Cl. ...................... 428/147; 428/148; 428/489; 427/186; 427/192; 524/60; 524/68; 524/368; 524/441; 524/834
[58] Field of Search ......................... 428/147, 144, 428/148, 489; 524/60, 68, 71, 834, 441, 368; 427/186, 192

[56] References Cited

U.S. PATENT DOCUMENTS

| | | | |
|---|---|---|---|
| 2,455,854 | 9/1948 | Condé | 524/441 |
| 3,391,100 | 7/1968 | Mitchell | 523/220 |
| 4,036,799 | 7/1977 | Westermann . | |
| 4,100,123 | 7/1978 | Westermann . | |
| 4,340,518 | 7/1982 | Nolte et al. . | |
| 4,484,951 | 11/1984 | Uchimura et al. . | |
| 4,565,716 | 1/1986 | Williams, Jr. et al. . | |
| 4,731,399 | 3/1988 | Fitzgerald et al. . | |
| 4,745,032 | 5/1988 | Morrison . | |
| 4,749,731 | 6/1988 | Kyminas et al. . | |
| 4,859,723 | 8/1989 | Kyminas et al. . | |
| 4,869,754 | 9/1989 | Kawabe et al. . | |
| 4,916,176 | 4/1990 | Vachlas et al. . | |
| 5,025,044 | 6/1991 | Christell et al. | 524/59 |
| 5,087,652 | 2/1992 | Christell . | |
| 5,104,922 | 4/1992 | Chang . | |
| 5,156,677 | 10/1992 | Carpenter et al. . | |
| 5,168,105 | 12/1992 | Anderson, Jr. et al. . | |
| 5,194,469 | 3/1993 | Srail et al. . | |
| 5,198,042 | 3/1993 | Masumoto et al. . | |
| 5,312,863 | 5/1994 | Van Rheenen et al. . | |
| 5,332,767 | 7/1994 | Reisser et al. . | |

FOREIGN PATENT DOCUMENTS

| | | |
|---|---|---|
| 149 373 | 7/1981 | Germany . |
| 60-179461 | 9/1985 | Japan . |

*Primary Examiner*—Veronica P. Hoke
*Attorney, Agent, or Firm*—Alan M. Biddison

[57] ABSTRACT

Coating compositions comprising aluminum pigment, neoprene latex asphalt emulsion, at least one surfactant for reducing reaction of the aluminum pigment with water and with the neoprene latex, at least one organic solvent, and water. The compositions are formed by providing an aluminum pigment mixture comprising aluminum pigment, the surfactant and the organic solvent, providing an aqueous neoprene latex asphalt emulsion and mixing the pigment mixture and the aqueous neoprene latex asphalt emulsion to form the coating composition. The compositions are suitable for coating a variety of surfaces, particularly roof structures and the like.

17 Claims, No Drawings

COATING COMPOSITIONS CONTAINING ALUMINUM PIGMENT AND METHODS OF COATING

CROSS REFERENCE TO RELATED APPLICATIONS

This application is a continuation-in-part of Ser. No. 08/481,949, filed Jun. 7, 1995, abandoned.

FIELD OF THE INVENTION

The present invention relates to coating compositions containing aluminum pigment and a neoprene latex asphalt emulsion. The coating compositions are particularly adapted for coating surfaces such as roofs.

BACKGROUND OF THE INVENTION

Many conventional roofing structures employ coatings based on asphalt or asphalt emulsions, both of which contain a large amount of volatile organic solvents. However, with the implementation of strict regulations requiring the reduction or elimination of the volatile organic content of such coatings, a need has developed for coating compositions which can replace the conventional asphalt and asphalt emulsion based compositions. As a result, various synthetic polymer-based coating compositions are being developed for use, inter alia, in roofing structures.

For example, the Kyminas et al. U.S. Pat. Nos. 4,749,731 and 4,859,723 disclose waterproof coating compositions for roof surfaces, which compositions comprise at least one film forming polymer, pigment material including clay, and water. Suitable polymers include polyacrylic polymers, polyvinyl acetate polymers, polyvinyl chloride polymers, polyvinylidene chloride polymers and combinations thereof. The clay may be employed alone or in combination with other pigment materials. The Morrison U.S. Pat. No. 4,745,032 discloses multi-ply roofing coating systems formed from acrylic resin coatings containing fly ash. The Srail et al. U.S. Pat. No. 5,194,469 and the Van Rheenen et al. U.S. Pat. No. 5,312,863 also disclose water-based polymer coating compositions.

Metal-containing pigments such as aluminum pigment have been employed in water-based polymer coating compositions, for example to increase adhesion, prevent corrosion and/or reflect heat radiation as disclosed in the Masumoto et al. U.S. Pat. No. 5,198,042. However, coating compositions containing metallic pigment such as aluminum and a water-containing polymer latex tend to decompose owing to the reaction of the metallic pigment and water. For example, in conventional coating compositions containing both aluminum pigment and water, the aluminum and water react to produce hydrogen gas. Accordingly, the storage stability of such compositions is very low. The Anderson, Jr. et al. U.S. Pat. No. 5,168,105 attempts to avoid this disadvantage by storing the aluminum pigment separate from the water-containing acrylic resin base of the composition. The two components are then mixed just before applying the coating composition to the desired surface. However, such systems are disadvantageous in that they require complex packaging and are cumbersome to the end user. The Vachlas et al. U.S. Pat. No. 4,916,176 discloses phosphate compounds and cationic salts of selected metals may be added to coating compositions containing water and metallic pigments in order to inhibit reaction of the metal pigment and water.

To serve as an acceptable substitute for asphalt-based coatings in the roofing industry, water-based polymer systems must exhibit, inter alia, good ultraviolet light resistance, water resistance, weatherability and heat reflection. Accordingly, there is a continuing need for water-based polymer coating compositions for use on roofing structures and having this advantageous combination of properties together with low volatile organic content and good storage stability.

SUMMARY OF THE INVENTION

It is therefore an object of the present invention to provide improved coating compositions which are particularly suitable for use on roof structures and surfaces. It is a further object of the invention to provide coating compositions which contain water-based polymers and have a low volatile organic content. It is a further object of the invention to provide water-based polymer coating compositions which contain metallic pigment, particularly aluminum pigment, and which exhibit good storage stability, ultraviolet light resistance, water resistance, weatherability and heat reflection.

These and additional objects are provided by the coating compositions of the present invention which comprise aluminum pigment and a neoprene latex asphalt emulsion. The coating compositions further include at least one surfactant for reducing reaction of the aluminum pigment with water and with the neoprene latex, at least one organic solvent and water. In a preferred embodiment, the coating compositions are prepared by first providing an aluminum pigment mixture comprising aluminum, at least one surfactant for reducing reaction of the pigment with water and with neoprene latex, and at least one organic solvent, providing an aqueous neoprene latex asphalt emulsion, and mixing the aluminum pigment mixture and the aqueous neoprene latex asphalt emulsion to form a coating composition. The present coating compositions have low volatile organic content and good storage stability wherein hydrogen gas formation is avoided. Additionally, the coating compositions of the present invention provide a good tack free coating upon drying of the compositions following application to a desired surface. The resulting coatings exhibit good ultraviolet light resistance, water resistance, weatherability and heat reflection.

These and additional objects and advantages will be more fully apparent in view of the following detailed description.

DETAILED DESCRIPTION

The coating compositions according to the invention comprise aluminum pigment and an aqueous neoprene latex asphalt emulsion. In order to overcome disadvantages of the prior art which result from the combination of aluminum pigment and water, the present compositions further contain at least one surfactant for reducing reaction of the aluminum pigment with water and with the neoprene latex, and at least one organic solvent. The organic solvent preferably comprises a compound which improves the dispersibility of the aluminum pigment and the surfactant in the neoprene latex asphalt emulsion, thereby facilitating the reduction of reaction of the aluminum pigment with water and with the neoprene latex which is provided by the surfactant.

The aluminum pigment which is included in the present compositions may comprise any conventional or commercially available aluminum pigment. The pigment may be pure aluminum or may contain one or more additional metal components. The pigment may be in the form of particles, flakes, platlets or the like. Many commercially available aluminum pigments are surface treated with one or more components, for example to reduce reaction of the aluminum pigment with water and/or to improve the dispersibility of the aluminum pigment in water or a solvent medium. Such surface-treated aluminum pigments are preferable for use in the compositions of the present invention. The size of the aluminum pigment included in the coating compositions of the present invention is not critical per se and may be selected depending on the end use of the coating compositions.

The neoprene latex asphalt emulsion employed in the present coating compositions and methods comprises an emulsion mixture of neoprene latex and asphalt. The ratio of neoprene latex and asphalt in the emulsion can vary depending on the desired use of the coating composition, and determination of a particular ratio is within the ability of one of ordinary skill in the art.

The neoprene latex which is employed in the coating compositions of the present invention may be any of the conventional or commercially available neoprene laticies. Generally, neoprene latex refers to any of the rubber-like polymers and copolymers of chloroprene, 2-chloro-1,3-butadiene. Copolymers of 2-chloro-1,3-butadiene may be formed with one or more additional ethyleneically unsaturated monomers in accordance with emulsion polymerization techniques known in the art. The neoprene latex employed in the compositions of the present invention is extremely resistant to oxidative degradation and ultraviolet radiation and also exhibits good weathering resistance and ozone resistance and waterproofing ability. A suitable emulsion for use in the present invention is available from BRC Corporation. The neoprene latex asphalt emulsion is preferably diluted with water before combination with the aluminum pigment.

The surfactant employed in the coating compositions of the present invention comprise one or more compounds which reduce reaction of the aluminum pigment with water and with the neoprene latex. As known in the art, a metallic pigment such as aluminum will generally react with water to produce hydrogen gas. Additionally, the present inventor has discovered that the aluminum pigment will also react with the allylic chlorine on the neoprene to form a crosslinked complex. Accordingly, the surfactant which is employed in the present coating compositions serves a dual purpose in that it reduces both reaction of the aluminum pigment with water and reaction of the aluminum pigment with the neoprene latex.

The surfactant used in the invention is any surfactant which will provide the dual function of reducing the reaction of the aluminum pigment with water and with the neoprene latex. Preferred surfactants are alkoxylated alkyl mercaptans or thioethers. Especially preferred surfactants are of the general formula:

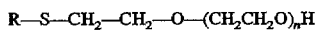

where R is an alkyl group of about 4 to 20 carbon atoms, including branched alkyl groups which can be secondary or tertiary alkyl groups, and n is from 4 to 12.

The alkoxylated alkyl mercaptan or thioether surfactants may be either deodorized or non-deodorized and the moles of ethoxylation may vary. Surfactants of this type are available commercially from Rhone-Poulenc under the tradename Alcodet®. An especially preferred surfactant of this type is Alcodet® HSC-1000. Another preferred surfactant is ethoxylated dodecyl mercaptan or thioether. The surfactant is preferably mixed with the aluminum pigment prior to combining the aluminum pigment with the neoprene latex asphalt emulsion or water.

The organic solvent which is included in the coating compositions of the present invention is included in order to improve the dispersibility of the aluminum pigment and the surfactant in the neoprene latex asphalt emulsion. Accordingly, it is preferred that the organic solvent is also premixed with the aluminum pigment and surfactant prior to combination of the aluminum pigment with the neoprene latex asphalt emulsion and/or water. The organic solvent should provide a hydrophilic/hydrophobic balance for compatibility between the solvent and the aluminum pigment and the aqueous neoprene latex asphalt emulsion. The solvent should also be selected to avoid poor leafing in the coating composition. Various organic solvents may be employed and those having low volatile organic content are preferred. Examples of solvents for use in the present compositions include alkylene glycol alkyl ethers and alkylene glycol alkyl ether acetates, for example dipropylene glycol tertiary butyl ether, diethylene glycol monobutyl ether, diethylene glycol monoethyl ether, propylene glycol methyl ether, ethylene glycol propyl ether, propylene glycol ethyl ether and acetates thereof. Other suitable solvents include toluene, isopropyl alcohol, dipropylene glycol and isobutyl acetate. Preferred solvents include dipropylene glycol tertiary butyl ether, diethylene glycol monobutyl ether acetate and dipropylene glycol normal butyl ether.

While the amounts of the various components in the present coating compositions may be varied depending on the intended use of the composition, it is preferred that the weight ratio of neoprene latex asphalt emulsion to aluminum pigment is in the range of from about 90:10 to about 50:50. The aluminum and neoprene very rapidly crosslink to yield discrete polymer clusters. If the aluminum pigment content is too low, the clusters contain a large amount of neoprene polymer chains as compared with aluminum pigment and yield a viscous lumpy mixture. On the other hand, greater amounts of aluminum can result in undesirably increased viscosity of the coating compositions. By balancing the aluminum/neoprene weight ratio, a uniform, smooth paste may be obtained. In a preferred embodiment, the weight ratio of neoprene latex asphalt emulsion to aluminum pigment is in the range of from about 80:20 to about 60:40 with a particularly preferred weight ratio comprising about 70:30 of neoprene latex asphalt emulsion to aluminum.

The additional water which is included in the coating compositions of the present invention is preferably added to dilute the neoprene latex asphalt emulsion prior to combination of the neoprene latex asphalt emulsion with the aluminum pigment. The use of the dilution water in the neoprene latex asphalt emulsion controls the final coating viscosity, and the amount of dilution water which is added to the neoprene latex asphalt emulsion may be varied widely to achieve a desired viscosity and dry rate. That is, the amount of water which is added to the neoprene latex asphalt emulsion is directly proportional to dry rate of the coating whereby increased levels of water yield longer dry times. In most instances, the weight ratio of neoprene latex asphalt emulsion to water should be in the range of from about 90:10 to about 50:50. Preferably, the weight ratio of neoprene latex asphalt emulsion to water is in the range from about 80:20 to about 60:40, and more preferably about 80:20 to about 70:30, with a weight ratio of neoprene latex asphalt emulsion to water of 75:25 advantageously producing a coating composition having a good viscosity which provides a thin smooth dry coating in about 24 hours.

The surfactant is included in the coating compositions in an amount sufficient to reduce reaction of the aluminum pigment with water and avoid generation of hydrogen gas and to reduce reaction of the aluminum pigment with the neoprene latex to form a composition having a viscosity suitable for coating. In most instances, the surfactant may be included in an amount of from about 4 to about 10 weight percent, based on the total weight of the aluminum pigment, the surfactant and the organic solvent. The organic solvent is included in an amount sufficient to improve the dispersibility of the aluminum pigment and the surfactant and in most instances may be employed in an amount from about 2 to about 25 weight percent based on the total weight of the aluminum pigment, the surfactant and the organic solvent.

Since the surfactant is employed to reduce reaction of the aluminum pigment and the organic solvent is employed to improve dispersibility of the aluminum pigment and the surfactant, it is preferred that in preparing the coating compositions of the present invention, the surfactant and the solvent are first mixed with the aluminum pigment to provide an aluminum pigment mixture, before combination of these components with the neoprene latex asphalt emulsion and water. In a further preferred embodiment, the neoprene latex asphalt emulsion is first diluted with the water to form a more dilute aqueous neoprene latex asphalt emulsion which is then mixed with the aluminum pigment mixture to form the present coating compositions.

The compositions of the present invention may be used to coat a variety of surfaces to provide water resistance, weather resistance, heat reflection and the like. In a preferred embodiment, the coating compositions are adapted for coating on a roof surface or structure. The coatings may be applied by any technique known in the art, including spray, brush, roll and the like.

The coating compositions of the present invention and methods for their use are demonstrated in the following example. In the example and throughout the present specification, parts and percentages are by weight unless otherwise indicated.

EXAMPLE 1

In this example, a coating composition according to the present invention was prepared. The aluminum pigment employed in the coating composition comprised the commercially available product LSB547 of Reynolds Metals Company. The aluminum pigment was in flake form and was provided with a surface treatment of lecithin; leciwet WD 120, and with 1-nitropropane to provide a low level of water protection and water dispersibility to the aluminum. The surfactant employed was the commercially available tertiary thioether surfactant, Alcodet HSC 1000, available from Rhone-Poulenc, and the solvent comprised dipropylene glycol tertiary butyl ether. The neoprene latex asphalt emulsion was supplied by BRC Corporation and had an initial solids content of 72 weight percent. In preparing the composition, the aluminum pigment, surfactant and solvent were first combined and the neoprene latex asphalt emulsion was diluted with deionized water. The aqueous neoprene latex asphalt emulsion was then added to the aluminum pigment mixture and the resulting mixture was blended until a uniform composition was obtained. The weight percentages of the components employed in the aluminum pigment mixture, Part A, the aqueous neoprene latex asphalt emulsion, Part B, and the final coating composition are set forth in Table 1.

TABLE 1

| COMPONENT | WEIGHT % IN PART A/B | WEIGHT % OF TOTAL COMPOSITION |
| --- | --- | --- |
| PART A | | |
| Aluminum Pigment | 79.05 | 23.72 |
| Surfactant | 4.8 | 1.44 |
| Solvent | 16.15 | 4.84 |
| PART B | | |
| Neoprene Latex Asphalt Emulsion | 75 | 63 |
| Deionized Water | 25 | 7 |

The resulting composition was then subjected to initial evaluation of appearance, tack, viscosity and reflectance. These evaluations were repeated, together with evaluation for gas formation, after one, two and three weeks as well as after four months of storage of the composition at room temperature. The results of these measurements are set forth in Table 2.

TABLE 2

| PROPERTY | INITIAL | 1 WEEK | 2 WEEKS | 3 WEEKS | 4 MONTHS |
| --- | --- | --- | --- | --- | --- |
| Draw Down Appearance | Thin, Fluid, No Lumps | Thin, Fluid, No Lumps | Thin, Fluid, No Lumps | Thin, Fluid, No Lumps | Thin, Fluid, No Lumps |
| Tack Free Dry | 24 hours | 24 hours | 24 hours | 24 hours | 24 hours |
| *Viscosity, 10 rpm, #5 spindle, Brookfield RVT | 14,600 cps | 5,300 cps | 2,200 cps | — | — |
| Gas Formation | | None Observed | None Observed | None Observed | None Observed |
| Reflectance | 62.8% | — | — | — | 62.4% |

*System is very thixotropic and viscosities were taken at 1 minute. After initial reading, all future readings were taken after coating is mixed by hand.

To measure the amount of hydrogen gas produced, the formulation was sealed in a metal can and stored at room temperature for the specified times. Typically, aluminum in the presence of water, will generate enough hydrogen gas to blow the lid and/or bulge the can. As set forth in Table 2, this material did not indicate any deformation to the can or pressure release when the can was opened.

Thus, even after four months of storage, the coating compositions according to the present invention exhibited good appearance, tack free dry, no gas formation, and excellent reflectance. The lower viscosity which was exhibited by the compositions over the monitored period did not appear to cause any increase in separation or fallout of solids.

EXAMPLE 2

This example demonstrates another composition according to the present invention. The composition was prepared in accordance with the procedure described in Example 1, using similar ingredients except that in this example, the solvent comprised dipropylene glycol normal butyl ether. The weight percentages of the components employed in the aluminum pigment mixture, Part A, the aqueous neoprene latex asphalt emulsion, Part B, and the final coating composition are set forth in Table 3.

TABLE 3

| COMPONENT | WEIGHT % IN PART A/B | WEIGHT % OF TOTAL COMPOSITION |
|---|---|---|
| PART A | | |
| Aluminum Pigment | 89.6 | 26.88 |
| Surfactant | 5.4 | 1.62 |
| Solvent | 5.0 | 1.50 |
| PART B | | |
| Neoprene Latex Asphalt Emulsion | 75 | 63 |
| Deionized Water | 25 | 7 |

The coating composition was evaluated as described in Example 1 and the properties as set forth in Table 4 were determined:

TABLE 4

| PROPERTY | PERFORMANCE |
|---|---|
| Draw Down Appearance | Thin fluid, no lumps |
| Tack Free Dry | 24 Hours |
| Reflectance | 64.4% |

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

I claim:

1. A coating composition, comprising (a) aluminum pigment, (b) a neoprene latex asphalt emulsion, (c) at least one surfactant comprising an alkoxylated alkyl mercaptan for reducing reaction of the aluminum pigment with water and with the neoprene latex, (d) at least one organic solvent, and (e) water;

wherein the weight ratio of neoprene latex asphalt emulsion to aluminum pigment is in the range of from about 90:10 to about 50:50;

wherein the weight ratio of neoprene latex asphalt emulsion to water is in the range of from about 90:10 to about 50:50; and wherein the surfactant comprises about 4 to about 10 weight percent, based on the total of the aluminum pigment, surfactant and organic solvent.

2. A coating composition as defined by claim 1, wherein the aluminum pigment is surface treated with a compound for reducing reaction of the aluminum pigment with water prior to adding to the coating composition.

3. A coating composition as defined by claim 2, wherein the aluminum pigment is surface treated with a compound for increasing the water dispersibility of the aluminum pigment.

4. A coating composition as defined by claim 1, wherein the neoprene latex comprises a homopolymer of 2-chloro-1,3-butadiene.

5. A coating composition as defined by claim 1, wherein the neoprene latex comprises a copolymer of 2-chloro-1,3-butadiene and at least one additional ethyleneically unsaturated monomer.

6. A coating composition as defined by claim 1, wherein the surfactant comprises a tertiary thioether or mercaptan of the formula:

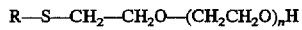

R—S—CH$_2$—CH$_2$O—(CH$_2$CH$_2$O)$_n$H wherein R is an alkyl group of about 4 to 20 carbon atoms, including branched alkyl groups which can be secondary or tertiary alkyl groups, and n is from 4 to 12.

7. A coating composition as defined by claim 1, wherein the at least one organic solvent comprises a compound which improves the dispersibility of the aluminum pigment and the surfactant in the neoprene latex asphalt emulsion.

8. A coating composition as defined by claim 7, wherein the organic solvent comprises an alkylene glycol alkyl ether.

9. A coating composition as defined by claim 1, wherein the weight ratio of neoprene latex asphalt emulsion to aluminum pigment is in the range of from about 80:20 to about 60:40.

10. A coating composition as defined by claim 1, wherein the weight ratio of neoprene latex asphalt emulsion to water is in the range of from about 80:20 to about 70:30.

11. A coating composition as defined by claim 1, wherein the organic solvent is included in an amount of from about 2 to about 25 weight percent based on the aluminum pigment, the surfactant and the organic solvent.

12. A coating composition, comprising (a) aluminum pigment, (b) a neoprene latex asphalt emulsion, (c) at least one surfactant comprising an alkoxylated alkyl mercaptan, (d) at least one organic solvent comprising dipropylene glycol tertiary butyl ether, diethylene glycol monobutyl ether acetate or dipropylene glycol normal butyl ether, and (e) water, the weight ratio of neoprene latex asphalt emulsion to aluminum pigment being in the range of from about 80:20 to about 60:40, the weight ratio of neoprene latex asphalt emulsion to water being in the range of from about 80:20 to about 70:30, the surfactant being included in an amount of from about 4 to about 10 weight percent, based on the aluminum pigment, the surfactant and the organic solvent, and the organic solvent being included in an amount of from about 2 to about 25 weight percent, based on the aluminum pigment, the surfactant and the organic solvent.

13. A roof structure having a coating thereon, said coating comprising (a) aluminum pigment, (b) a neoprene latex asphalt emulsion, (c) at least one surfactant comprising an alkoxylated alkyl mercaptan for reducing reaction of the aluminum pigment with water and with the neoprene latex, (d) at least one organic solvent, and (e) water;

wherein the weight ratio of neoprene latex asphalt emulsion to aluminum pigment is in the range of from about 90:10 to about 50:50;

wherein the weight ratio of neoprene latex asphalt emulsion to water is in the range of from about 90:10 to about 50:50; and wherein the surfactant comprises about 4 to about 10 weight percent, based on the total of the aluminum pigment, surfactant and organic solvent.

14. A method of preparing a coating composition, comprising (a) providing an aluminum pigment mixture comprising aluminum pigment, at least one surfactant comprising an alkoxylated alkyl mercaptan for reducing reaction of the aluminum pigment with water and with neoprene latex, and at least one organic solvent, (b) providing an aqueous neoprene latex asphalt emulsion, and (c) mixing the aluminum pigment mixture and the aqueous neoprene latex asphalt emulsion to form a coating composition; and wherein the weight ratio of neoprene latex asphalt emulsion to aluminum pigment is in the range of from about 90:10 to about 50:50;

wherein the weight ratio of neoprene latex asphalt emulsion to water is in the range of from about 90:10 to about 50:50; and wherein the surfactant comprises about 4 to about 10 weight percent, based on the total of the aluminum pigment, surfactant and organic solvent.

15. A method of coating a surface, comprising (a) providing an aluminum pigment mixture comprising aluminum pigment, at least one surfactant comprising an alkoxylated alkyl mercaptan for reducing reaction of the aluminum pigment with water and with neoprene latex, and at least one organic solvent, (b) providing an aqueous neoprene latex asphalt emulsion, (c) mixing the aluminum pigment mixture and the aqueous neoprene latex asphalt emulsion to form a roof coating composition, and (d) applying the resulting mixture to the surface; and wherein the weight ratio of neoprene latex asphalt emulsion to aluminum pigment is in the range of from about 90:10 to about 50:50;

wherein the weight ratio of neoprene latex asphalt emulsion to water is in the range of from about 90:10 to about 50:50; and wherein the surfactant comprises about 4 to about 10 weight percent, based on the total of the aluminum pigment, surfactant and organic solvent.

16. A two part aluminum pigment composition for mixing to form a coating composition, wherein Part A of said composition comprises aluminum pigment, at least one surfactant comprising an alkoxylated alkyl mercaptan, and at least one organic solvent, and Part B comprises a neoprene latex asphalt emulsion and water;

wherein, when said Part A and Part B are mixed to form said composition, the weight ratio of neoprene latex asphalt emulsion to aluminum pigment is in the range of from about 90:10 to about 50:50; the weight ratio of neoprene latex asphalt emulsion to water is in the range of from about 90:10 to about 50:50; and wherein the surfactant comprises about 4 to about 10 weight percent, based on the total of the aluminum pigment, surfactant and organic solvent.

17. A two part composition according to claim 16, wherein the surfactant comprises a mercaptan of the formula:

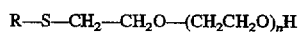

wherein R is an alkyl group of about 4 to 20 carbon atoms, including branched alkyl groups which can be secondary or tertiary alkyl groups, and n is from 4 to 12.

* * * * *